(12) United States Patent
Yen et al.

(10) Patent No.: US 7,222,161 B2
(45) Date of Patent: May 22, 2007

(54) METHOD AND SYSTEM FOR FACILITATING USAGE OF LOCAL CONTENT AT CLIENT MACHINE

(76) Inventors: Robert C. Yen, 670 Los Pinos Ave., Milpitas, CA (US) 95035; C. Douglass Thomas, 1193 Capri Dr., Campbell, CA (US) 95008

( * ) Notice: Subject to any disclaimer, the term of this patent is extended or adjusted under 35 U.S.C. 154(b) by 538 days.

(21) Appl. No.: 09/919,335

(22) Filed: Jul. 30, 2001

(65) Prior Publication Data

US 2002/0023141 A1    Feb. 21, 2002

Related U.S. Application Data

(63) Continuation-in-part of application No. 09/721,907, filed on Nov. 24, 2000.

(60) Provisional application No. 60/210,229, filed on Aug. 8, 2000, provisional application No. 60/221,873, filed on Jul. 29, 2000, provisional application No. 60/188,982, filed on Mar. 13, 2000, provisional application No. 60/167,516, filed on Nov. 24, 1999.

(51) Int. Cl.
*G06F 15/16* (2006.01)
*G06F 7/00* (2006.01)

(52) U.S. Cl. ...................... 709/217; 709/203

(58) Field of Classification Search ........ 709/217–219, 709/203; 707/3, 10
See application file for complete search history.

(56) References Cited

U.S. PATENT DOCUMENTS

| | | | |
|---|---|---|---|
| 5,521,591 A | 5/1996 | Arora et al. | |
| 5,701,451 A | 12/1997 | Rogers et al. | |
| 5,764,235 A | 6/1998 | Hunt et al. | |
| 5,809,242 A | 9/1998 | Shaw et al. | |
| 5,870,562 A | 2/1999 | Butman et al. | |
| 5,892,825 A | 4/1999 | Mages et al. | |
| 5,896,502 A | 4/1999 | Shieh et al. | |
| 5,918,013 A * | 6/1999 | Mighdoll et al. | ........... 709/217 |
| 5,933,600 A | 8/1999 | Shieh et al. | |
| 5,944,780 A | 8/1999 | Chase et al. | |

(Continued)

FOREIGN PATENT DOCUMENTS

WO    WO 01/11488 A2    2/2001

(Continued)

OTHER PUBLICATIONS

PC Shareware., Book Browser-Publish HTML pages on a disk, http://www.pc-shareware.com, downloaded May 3, 2006 [retrieved from Internet Web Archive http//web.archive.org/ 19970402213735].*

(Continued)

*Primary Examiner*—Krisna Lim
*Assistant Examiner*—LaShanya Nash

(57) ABSTRACT

Improved techniques for data delivery from a server machine to client machines through a network are disclosed. The techniques reduce the demands on connection bandwidth between the client machines and the network, and thus enable media-rich data to be delivered with reduced amounts of network bandwidth. The techniques also reduce the bandwidth demands on network servers and overall network infrastructure. According to one aspect, web pages (e.g., markup language documents) can be modified to cause local content to be used or at least preferred over remotely located content.

19 Claims, 7 Drawing Sheets

U.S. PATENT DOCUMENTS

| | | | |
|---|---|---|---|
| 5,956,716 A | | 9/1999 | Kenner et al. |
| 5,961,602 A | | 10/1999 | Thompson et al. |
| 5,987,480 A | | 11/1999 | Donohue et al. |
| 5,987,547 A | * | 11/1999 | Panasik et al. ............. 710/301 |
| 5,991,798 A | * | 11/1999 | Ozaki et al. ................ 709/217 |
| 5,991,809 A | | 11/1999 | Kriegsman |
| 5,996,007 A | | 11/1999 | Klug et al. |
| 6,003,030 A | | 12/1999 | Kenner et al. |
| 6,006,264 A | | 12/1999 | Colby et al. |
| 6,014,698 A | | 1/2000 | Griffiths |
| 6,014,707 A | | 1/2000 | Miller et al. |
| 6,038,601 A | | 3/2000 | Lambert et al. |
| 6,076,103 A | * | 6/2000 | Sakai ......................... 709/217 |
| 6,108,655 A | * | 8/2000 | Schleimer et al. ............ 707/10 |
| 6,108,686 A | | 8/2000 | Williams, Jr. |
| 6,108,703 A | | 8/2000 | Leighton et al. |
| 6,112,239 A | | 8/2000 | Kenner et al. |
| 6,115,378 A | | 9/2000 | Hendel et al. |
| 6,125,209 A | * | 9/2000 | Dorricott .................... 382/233 |
| 6,166,729 A | * | 12/2000 | Acosta et al. ............... 345/719 |
| 6,185,598 B1 | | 2/2001 | Farber et al. |
| 6,249,787 B1 | * | 6/2001 | Schleimer et al. ............ 707/10 |
| 6,275,819 B1 | | 8/2001 | Carter |
| 6,557,054 B2 | * | 4/2003 | Reisman ...................... 710/33 |
| 6,605,120 B1 | * | 8/2003 | Fields et al. ................ 715/513 |
| 6,904,455 B1 | * | 6/2005 | Yen ............................ 709/217 |

FOREIGN PATENT DOCUMENTS

| | | |
|---|---|---|
| WO | WO 01/11502 A2 | 2/2001 |
| WO | WO 01/ 11503 A2 | 2/2001 |

OTHER PUBLICATIONS

Akamai Technologies, Inc., webpages on Akamai Streaming Overview and Freeflow, http://www.akamai.com, downloaded Feb. 20, 2000.

Cnet features-techno-20 questions: How the Net works, "How does the Net work?" http://coverage.cnet.com/Content/Features/Techno/Networks/ss02.html, downloaded Feb. 19, 2000.

Cnet features-techno-20 questions: How the Net works, "What is the Internet?" http://coverage.cnet.com/Content/Features/Techno/Networks/ss01.html, downloaded Feb. 19, 2000.

"iShopper.com Inc. Acquires Uniq Studios Inc.", Company Press Release, May 16, 2000, http://biz.yahoo.com/bw/000516/ut_ishoppe.html, downloaded Jul. 9, 2000.

* cited by examiner

METHOD AND SYSTEM FOR FACILITATING USAGE OF LOCAL CONTENT AT CLIENT MACHINE

CROSS-REFERENCE TO RELATED APPLICATIONS

This is a continuation-in-part application of U.S. patent application Ser. No. 09/721,907, filed Nov. 24, 2000, and entitled "METHOD AND SYSTEM FOR PROVIDING LOCAL CONTENT FOR USE IN PARTIALLY SATISFYING INTERNET DATA REQUESTS FROM REMOTE SERVER," which in turn claims the benefit of U.S. Provisional Patent Application Nos. 60/210,229 filed Aug. 8, 2000; 60/188,982 filed Mar. 13, 2000; and 60/167,516 filed Nov. 24, 1999, and which is hereby incorporated by reference herein.

This application also claims the benefit of U.S. Provisional Patent Application No. 60/221,873, filed Jul. 29, 2000, and entitled "METHOD AND SYSTEM FOR FACILITATING USAGE OF LOCAL CONTENT AT CLIENT MACHINE," and which is hereby incorporated by reference herein.

This application also related to U.S. patent application Ser. No. 09/578,816, filed May 24, 2000, and entitled "METHOD AND SYSTEM FOR REDUCTION OF DELAY AND BANDWIDTH REQUIREMENTS IN INTERNET DATA TRANSFER", and which is hereby incorporated by reference herein.

BACKGROUND OF THE INVENTION

1. Field of the Invention

The present invention relates to networks and, more particularly, to data transmission over networks.

2. Description of the Related Art

The Internet or the World Wide Web is a global network of interconnected computers. Clients or users can access files or documents, e.g., hypermedia documents, residing on host website computers connected to the Internet through a network browser interface program. Examples of network browser interface program include Netscape Navigator or Microsoft Explorer. One type of hypermedia documents is commonly referred to as web pages. Sites (websites) or documents on the Internet are typically chosen by a user by entering a site address, i.e., a URL (uniform resource locator), or by a selection of a link on a displayed web page. The links are typically associated with an HyperText Markup Language (HTML) environment and can be represented by an image, icon, or text label in a web page.

Unfortunately, due to the increased popularity of the Internet and due to the increase in file size of web pages, traffic and congestion on the Internet continue to increase. One reason why web pages being requested are get larger is due the increased use graphic components by websites. It is becoming increasing popular for websites to utilize media-rich web pages. The more media-rich a web page is, the larger its size. Hence, media-rich web pages lead to increased traffic and congestion burdens on various aspects of the Internet and servers coupled thereto. Conventional solutions to these traffic or congestion problems have caused website owners to increase the number of servers they operate and have caused website owners to lease additional bandwidth for coupling their servers to the Internet, both of which are expensive solutions.

The increases in the file sizes of web pages also burdens the clients (users) of client machines attempting to obtain web pages from servers over the Internet. Given that client machines couple to the Internet over bandwidth-limited links, clients face increasing delays. Typically, the bandwidth-limited links are provided by an Internet Service Provider (ISP). Examples of the links include plain old telephone (POT) line, ISDN line, DSL line, or cable line. While some links support more bandwidth, the additional bandwidth comes at a cost to the clients. Regardless, of the link, as the size of web pages get larger, the longer it takes to download the files to the client machine. Hence, as files (e.g., web pages) become larger (e.g., more media rich), the longer they take to be downloaded to the client machines. While media-rich web pages offer great ability to hold users' interest, download delays frustrate users and can cause loss of traffic to websites.

Therefore, there is a need for improved techniques for efficiently and economically delivering web pages to client machines.

SUMMARY OF THE INVENTION

Broadly speaking, the invention relates to improved techniques for data delivery from a server machine to client machines through a network. The techniques reduce the demands on connection bandwidth between the client machines and the network, and thus enable media-rich data to be delivered with reduced amounts of network bandwidth. The techniques also reduce the bandwidth demands on network servers and overall network infrastructure. According to one aspect of the invention, web pages (e.g., markup language documents) can be modified to cause local content to be used or at least preferred over remotely located content.

The invention can be implemented in numerous ways, including as a computer system, an apparatus, a method, and a computer readable medium. Several embodiments of the invention are discussed below.

As a method for modifying a web page to point to local content instead of remote content, one embodiment of the invention includes at least the operations of: receiving a web page to be modified; scanning the web page to locate an image in the web page; determining whether the image is supported by an image database that stores images associated with portable computer readable storage products distributed to users; and modifying the web page to direct retrieval of content for the image to be retrieved locally from the portable computer readable storage products instead of from the remote content.

As a method for modifying a web page to point to local content on a portable computer readable storage product instead of remote content, one embodiment of the invention includes at least the operations of: receiving a web page to be modified, the web page including at least one image, the source for the content for the image being linked to a remote location; and modifying the web page to direct retrieval of content for the image to be retrieved locally from the portable computer readable storage product instead of from the remote content.

As a method for creating portable computer readable storage products to be distributed to users, one embodiment of the invention includes at least the operations of: receiving web pages to be modified; scanning the web pages to locate high-bandwidth content on the web pages; determining whether the high-bandwidth content is supported by a database that stores high-bandwidth content associated with portable computer readable storage products to be created; adding the high-bandwidth content to the database when said determining determines that the high-bandwidth content is not yet supported by the database; and creating portable computer readable storage products for distribution to users by storage of the high-bandwidth content from the database to the portable computer readable storage products.

As a computer readable medium including at least computer program code for automatically modifying a web page to point to local content on a portable computer readable storage product instead of remote content, one embodiment of the invention includes at least: computer program code for receiving a web page to be modified, the web page including at least one high-bandwidth content component, the source for the content for the high-bandwidth content component being linked to a remote location; and computer program code for modifying the web page to direct retrieval of content for the high-bandwidth content component to be retrieved locally from the portable computer readable storage product instead of from the remote content.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for data delivery from a server machine to client machines through a network. The techniques reduce the demands on connection bandwidth between the client machines and the network, and thus enable media-rich data to be delivered with reduced amounts of network bandwidth. The techniques also reduce the bandwidth demands on network servers and overall network infrastructure. According to one aspect of the invention, web pages (e.g., markup language documents) can be modified to cause local content to be used or at least preferred over remotely located content.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
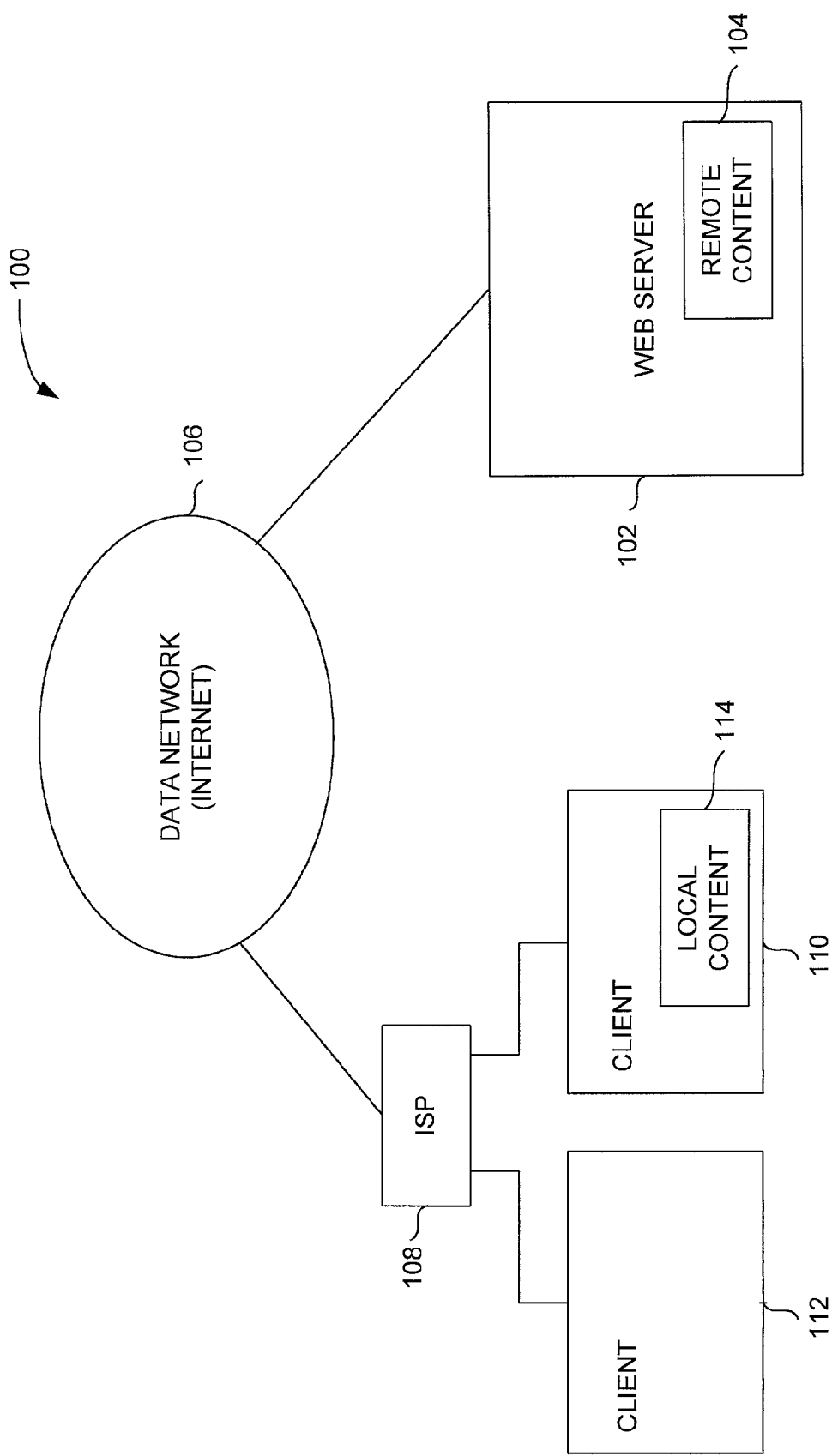
FIG. 1 is a block diagram of a distributed content delivery system according to one embodiment of the invention.

FIG. 1 is a block diagram of a distributed content delivery system 100 according to one embodiment of the invention. The distributed content delivery system 100 includes a web server 102 that controls access to remote content 104. The web server 102 couples to a data network 106. In one embodiment, the data network 106 includes the Internet. Typically, the web server 102 couples to the data network 106 over a high speed connection, such as over a leased line (e.g., a T1 or T4 line). An Internet Service Provider (ISP) 108 also couples to the data network 106. Typically, the ISP 108 couples to the data network over a high speed connection, such as over a leased line. The ISP 108 services a plurality of clients, such as client 110 and client 112. The client 110 is shown as having local content 114 available for use, whereas the client 112 is assumed not to have any such local content available.

The distributed content delivery system 100 operates to reduce the data transmission load through the data network 106. More particularly, during operation of the client 110 and the web server 102, the local content 114 is utilized to reduce the amount of data (e.g., remote content 104) that is transmitted from the web server 102 to the client 110 through the data network 106. Not only is the data transmission load reduced on the web server 102 and the data network 106, but also for the ISP 108 and its connections with the data network 106 and the client 110.

Figure 2:
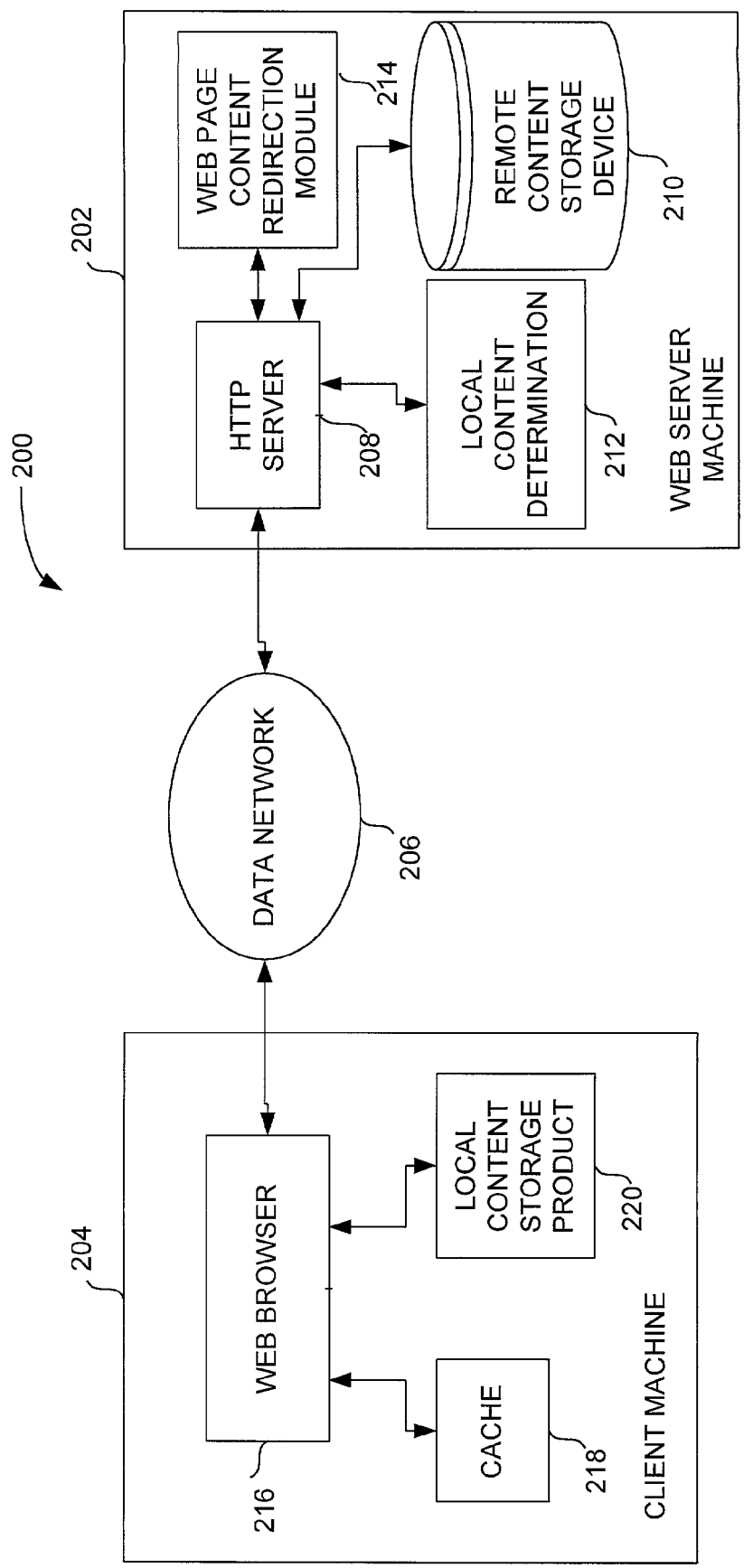
FIG. 2 is a block diagram of a distributed content delivery system according to one embodiment of the invention.

FIG. 2 is a block diagram of a distributed content delivery system 200 according to one embodiment of the invention. The distributed content delivery system 200 includes a web server machine 202 and a client machine 204. The web server machine 202 and the client machine 204 are interconnected through a data network 206. In one embodiment, the data network 206 includes the Internet.

The web server machine 202 includes a HTTP server 208. The HTTP server 208 controls the web server machine 202 in both receiving a request for content as well as for responding to the request with the delivery of data. The HTTP server 208 couples to a remote content storage device 210 to obtain remote content stored therein. The HTTP server 208 also couples to a local content determination module 212 and a web page content redirection module 214. Typically, when a request for data is received at the HTTP server 208, certain remote content is accessed and thereby retrieved from the remote content storage device 210 and then sent back through the data network 206 as a response to the requesting client machine.

According to the invention, the HTTP server 208 can make use of the local content determination module 212 and the web page content redirection module 214 to reduce the amount of remote content that needs to be transmitted from the web server machine 202 to the client machine 204. In this regard, the local content determination module 212 can examine the incoming request, or data (e.g., codes) associated therewith, to determine whether the requesting client machine has local content that can be used to supplant (be used in place of) some of the remote content. When the local content determination module 212 determines that suitable local content is available at the requesting client machine, then the HTTP server 208 can interact with the web page content redirection module 214 to modify, construct or select the response to the client machine 204 so as to reduce the amount of remote data to be sent and to redirect the requesting client machine to access pertinent portions of the local content to supplement the remotely supplied content.

The client machine 204 includes a web browser 216, a cache 218, and a local content storage product 220. The web browser 216 is a network browser such as Microsoft Internet Explorer or Netscape Navigator. The cache 218 is used by the web browser 216 to store previously requested remote content that has been received at the client machine 204.

Typically, the web browser 216 stores such previously obtained requested data in the cache 218 on a disk drive associated with the client machine 204. The local content storage product 220 is typically a portable computer readable medium such as a CD-ROM, floppy disk, data storage card, or any other portable or semi-portable computer readable medium.

In the web server machine 202, the web page content redirection module 214 is able to dynamically modify or produce a reduced size response by referring to local content in place of supplying remote content. The web page content redirection module 214 can also predetermine reduced size responses. For example, web pages stored in the remote content storage device 210 can be processed to produce reduced size versions that refer to local content. When predetermined, the reduced size responses can also be stored in the remote content storage device 210. Also, when predetermined, the web page content redirection module 214 need only select the reduced size response (instead of a full size response). Still further, the determination of the reduced size versions can be done by a different computer other than the web server machine 202.

Figure 3:
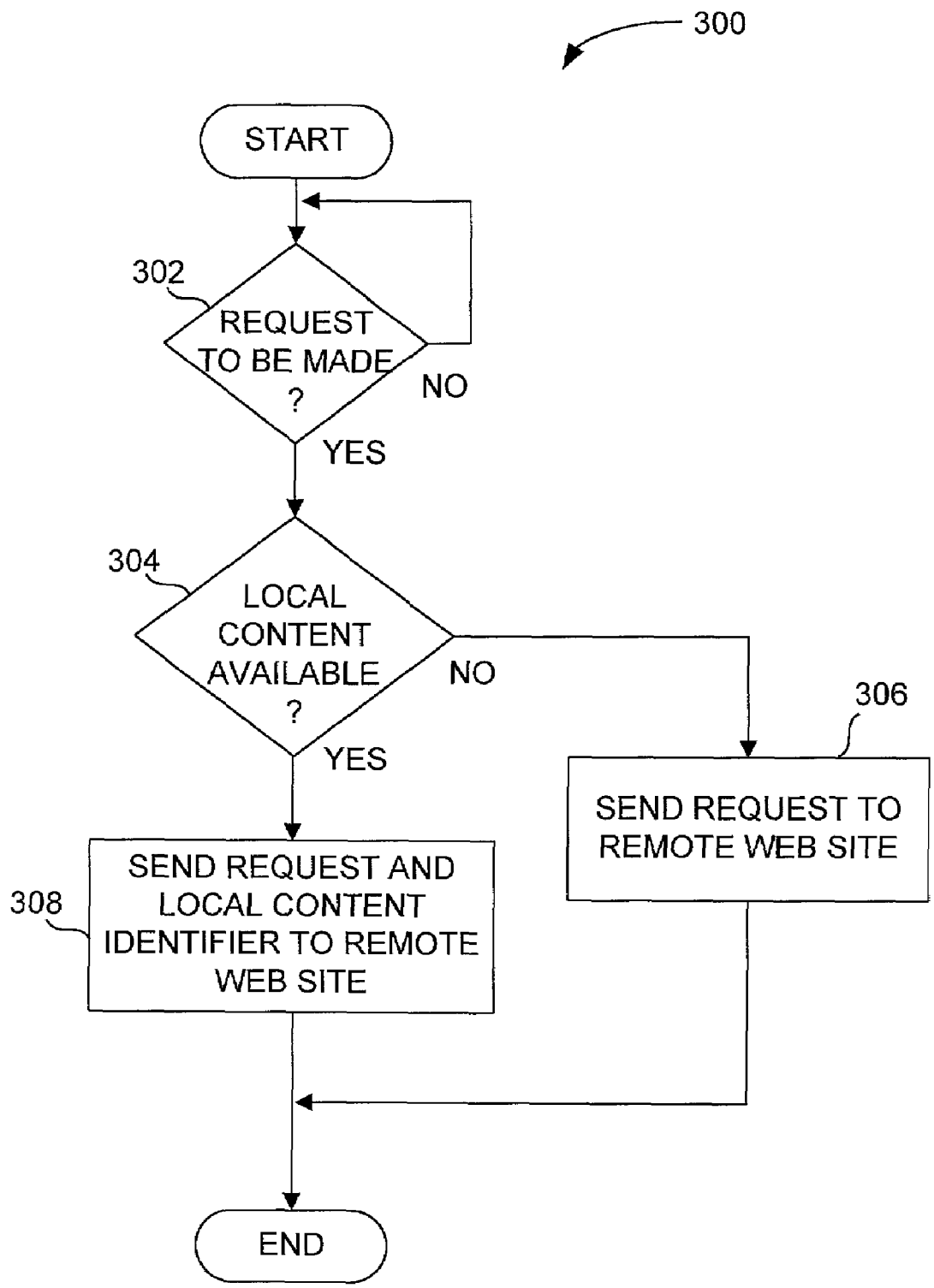
FIG. 3 is a flow diagram of client-side request processing according to one embodiment of the invention.

FIG. 3 is a flow diagram of client-side request processing 300 according to one embodiment of the invention. The client-side request processing 300 is, for example, performed by the client machine 204 illustrated in FIG. 2 or the client machine 110 illustrated in FIG. 1.

The client-side request processing 300 begins with a decision 302 that determines whether a request is to be made. When the decision 302 determines that a request does not need to be made, the client-side request processing 300 awaits the need for a request. Once the decision 302 determines that a request is to be made, a decision 304 determines whether local content is available. When the decision 304 determines that local content is not available, then a request is sent 306 to the remote web site (e.g., the web server machine 202). Alternatively, when a decision 304 determines that local content is available, then a request together with a local content identifier are sent 308 to the remote web site. Typically, a request operates to request a web page from the remote web site. The local content identifier can identify the local content available at the client machine. For example, the local content can be provided by the local content storage product 220 of the client machine 204 illustrated in FIG. 2. Following the operations 306 and 308, the client-side request processing 300 is complete and ends.

Figure 4:
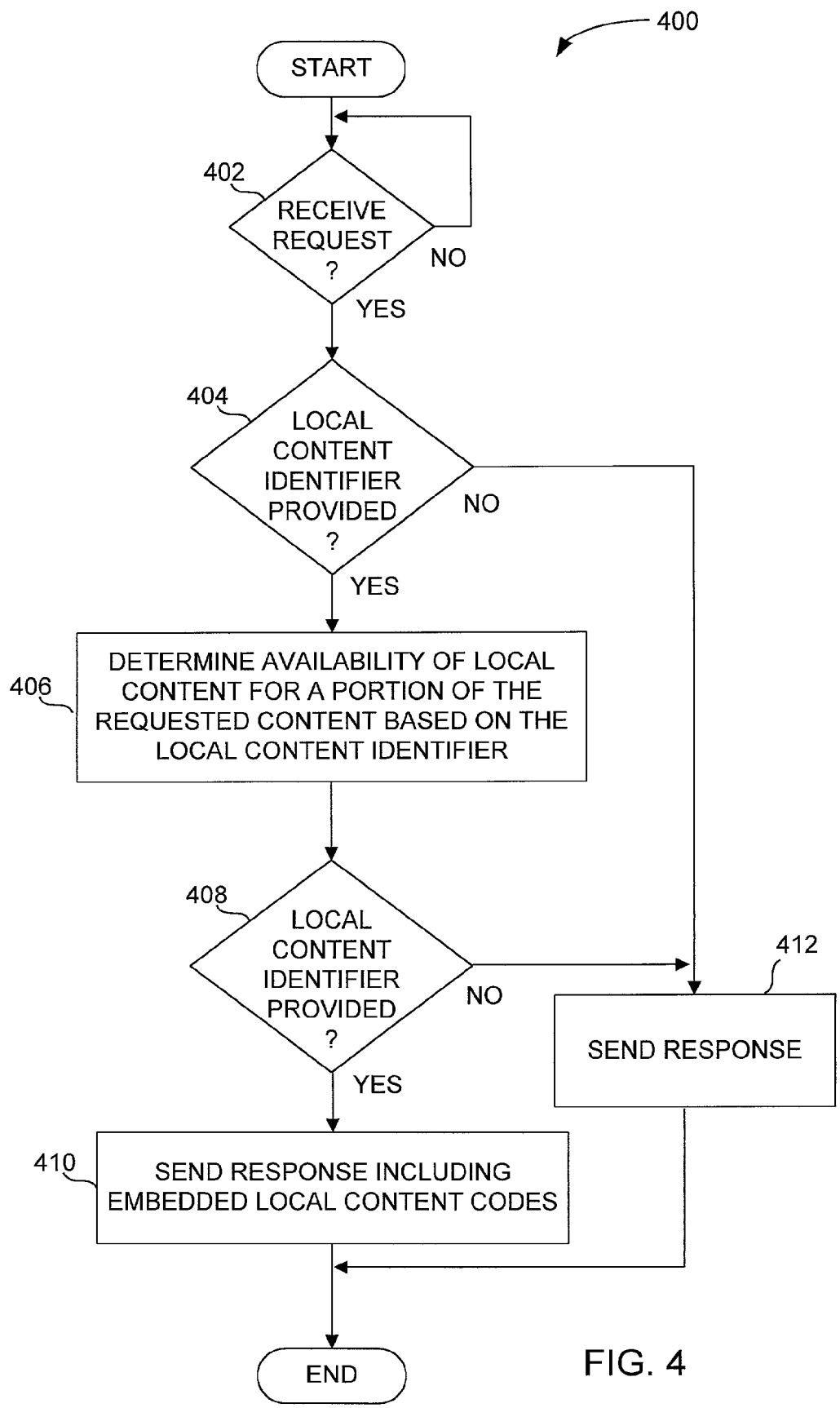
FIG. 4 is a flow diagram of server-side response processing according to one embodiment of the invention.

FIG. 4 is a flow diagram of server-side response processing 400 according to one embodiment of the invention. The server-side response processing 400 is, for example, performed by the web server machine 202 illustrated in FIG. 2 of the web server 102 illustrated in FIG. 1.

The server-side response processing 400 begins with a decision 402 that determines whether a request has been received. When the decision 402 determines that a request has not been received, then the server-side response processing 400 awaits the receipt of a request. Once the decision 402 determines that a request has been received, the decision 404 determines whether a local content identifier has been provided. Typically, the local content identifier can be provided within the request or be associated with the request. In other embodiments, the local content identifier can be separately requested from the client machine.

When the decision 404 determines that a local content identifier has been provided, the availability of local content is determined 406 based on the local content identifier. Next, a decision 408 determines whether the needed local content for at least a portion of the requested content is available. When the decision 408 determines that the needed local content is available, then a response is sent 410 (e.g., from the web server machine 202) including local content codes. In one embodiment, the local content codes are embedded in the response. When the local content codes are included in the response, the response has a reduced size because certain remote content that is locally available content is not part of the response and is instead replaced by the local content codes. Alternatively, when the decision 404 determines that no local content identifier has been provided or when the decision 408 determines that the needed local content is not available, then the response is sent 412 without reference to any local content. Following operations 410 and 412, the server-side response processing 400 is complete and ends.

Figure 5:
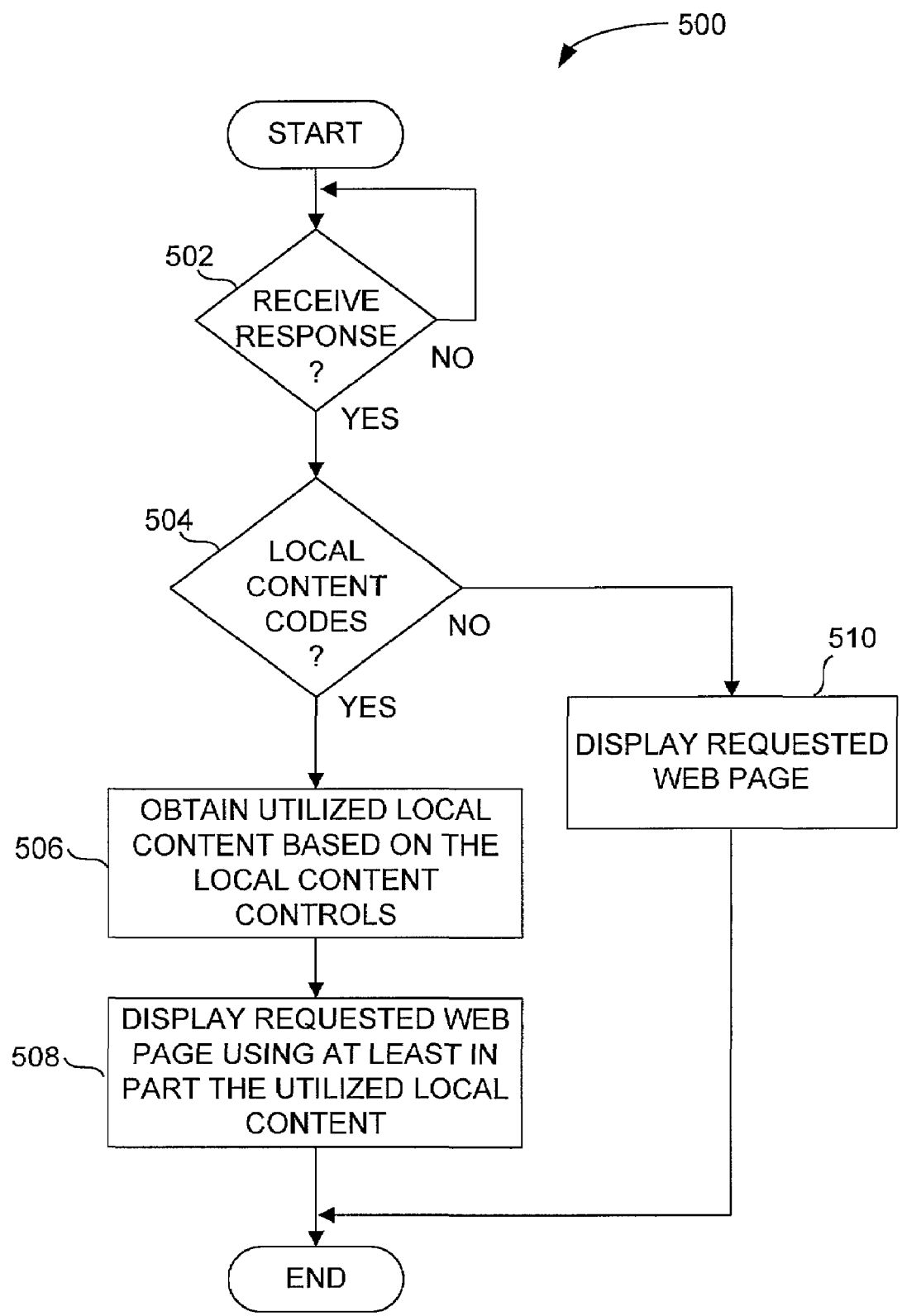
FIG. 5 is a flow diagram of client-side response processing according to one embodiment of the invention.

FIG. 5 is a flow diagram of client-side response processing 500 according to one embodiment of the invention. The client-side response processing 500 is, for example, performed by the client machine 204 illustrated in FIG. 2.

The client-side response processing 500 begins with a decision 502 that determines whether a response has been received. When the decision 502 determines that a response has not yet been received, the client-side response processing 500 awaits such a response. Once the decision 502 determines that a response has been received, a decision 504 determines whether local content codes are provided with the response. In one embodiment, the local content codes are embedded in the response. When the decision 504 determines that local content codes are provided with the response, then the utilized local content is obtained 506 based on the local content controls. Here, the local content being utilized with the response, namely, the local content portion of the response, is obtained 506 from the local content storage product, such as the local content storage product 220 of the client machine 204 illustrated in FIG. 2. In other words, the local content is provided by a portable data storage product.

Next, the requested web page (resource) is displayed 508 using at least in part the utilized local content. The web page being displayed is thus the result of remote content obtained from the remote web site (web server) as well as the local content obtained locally such as from the local content storage product associated with the client machine. Following the display of the requested web page, the client-side response processing 500 is complete and ends. Alternatively, when the decision 504 determines that the response does not include local content codes, then instead of operations 506 and 508, the client-side response processing simply displays 510 of the requested web page provided by the remote web server. Following the operation 510, the client-side response processing 500 is complete and ends.

Accordingly, the invention facilitates the providing users with high resolution graphic images without requiring long user waiting periods for image downloads and without needing to consume large amounts of precious network bandwidth. Hence, users receive high resolution images with fast response times. The high resolution images can be used for many purposes. Some examples of uses for the high resolution images can pertain to advertisements, products, and services. As a particular example, the invention facilitates a website providing an online merchandise catalog having high resolution images that are rapidly retrievable.

Figure 6:
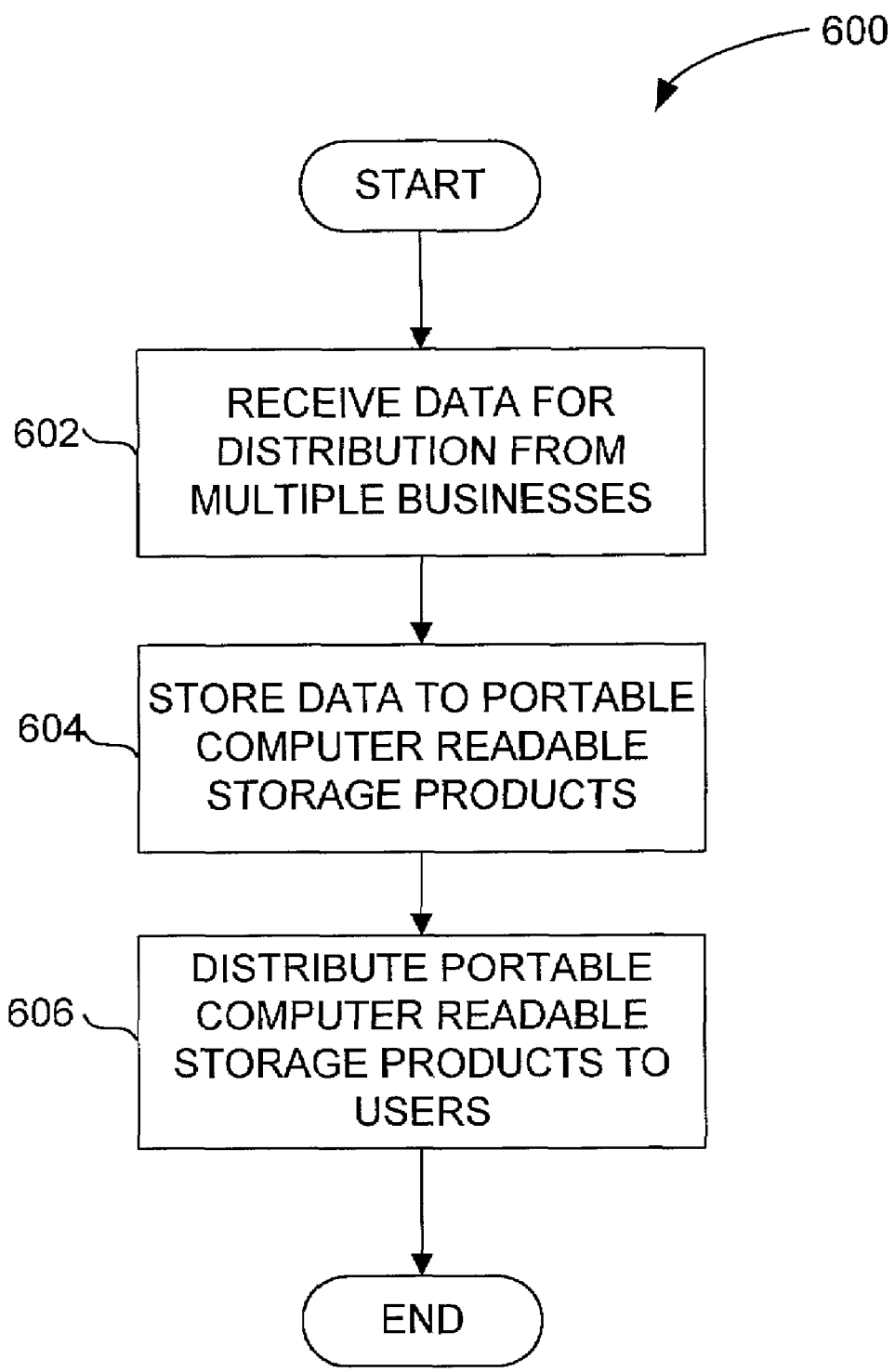
FIG. 6 is a flow diagram of a distribution method for portable computer readable storage products.

FIG. 6 is a flow diagram of a distribution method 600 for portable computer readable storage products. The distribution method 600 receives 602 data for distribution from multiple businesses. The data is stored 604 to portable computer readable storage products. In one embodiment, the data includes images or graphics. Images or graphics are commonly used with websites to provide a more interesting or productive user interface. As examples, the images or graphics can pertain to advertising, products, buttons, icons, logos, videos, animations, and the like. Since images or graphics tend to have relatively file sizes (as compared to text), providing images or graphics on portable readable storage products which are locally available can provide significant improvements in responsiveness in accessing (viewing) websites from a browser. After the data is stored 604 to the portable computer readable storage products, the portable computer readable storage products are distributed 606 to users.

The portable computer readable storage products can be distributed to uses in a variety of ways. For example, the portable computer readable storage products can be mailed to users. As another example, the portable computer readable storage products can be made available at various locations (e.g., food or retail stores). Still another example is the distribution of the portable computer readable storage products with newspaper delivery. With respect to providing content for advertisements, the portable computer readable storage products can contain basic advertisement components. A manufacturer's image for a product can be used by multiple retailers or distributors. Hence, this enables inefficiencies that would occur in redundant images were used for each of the retailers and distributors.

Thereafter, the users can place the portable computer readable storage product into a data reader of their internet-enabled computing device. For example, the data reader can be associated with a storage medium drive (e.g., card slot controller, CD drive, or floppy drive). Then, when the user requests website content, a portion of the website content that is available locally is obtained from the portable computer readable storage product via the data reader instead of over the network.

Since the data (content) on the portable computer readable storage product may become stale or out-dated at some point, the portable computer readable storage products are preferable periodically updated and then redistributed to the users. The one or more local content identifiers can inform web servers whether the available local content is current (i.e., not stale).

Incentives can be provided to encourage users to retrieve or use the portable computer readable storage products. The types of incentives can vary widely and might, for example, include performance improvement (e.g., fast downloads), money, sweepstakes, prices, frequent flyer miles, coupons, rebates, etc.

In one embodiment, remote websites are able to control the use of data from clients' local computer readable storage product(s). When local content is available and used by remote websites, such remote websites realize financial benefits by savings on channel bandwidth requirements which are reduced and realize improvements in data transfer speed due to less Internet traffic congestion. The clients realize the benefit of a more reliable data transfer and a much shorter average wait for a medium to large size data transfer. The invention can also improve system reliability of remote web sites during the peak use period due to the reduction in data traffic at its own server system and routers.

In order for websites, namely, web pages of websites, to utilize the available local content provided by the portable computer readable storage product, the client machine or the server machine needs to cause the available local content to be used instead of receiving some remote content over the network. In one embodiment, the network browser can include a plug-in to determine presence of the portable computer readable storage product and operate to obtain certain content therefrom. In another embodiment, the server machine (or third party server machine) can modify conventional web pages to cause local content to be used or at least preferred. The modifications to conventional web pages can be performed dynamically using DHTML, JavaScript, VBscript, or other scripting language. The modifications can also be performed in advance.

Figure 7:
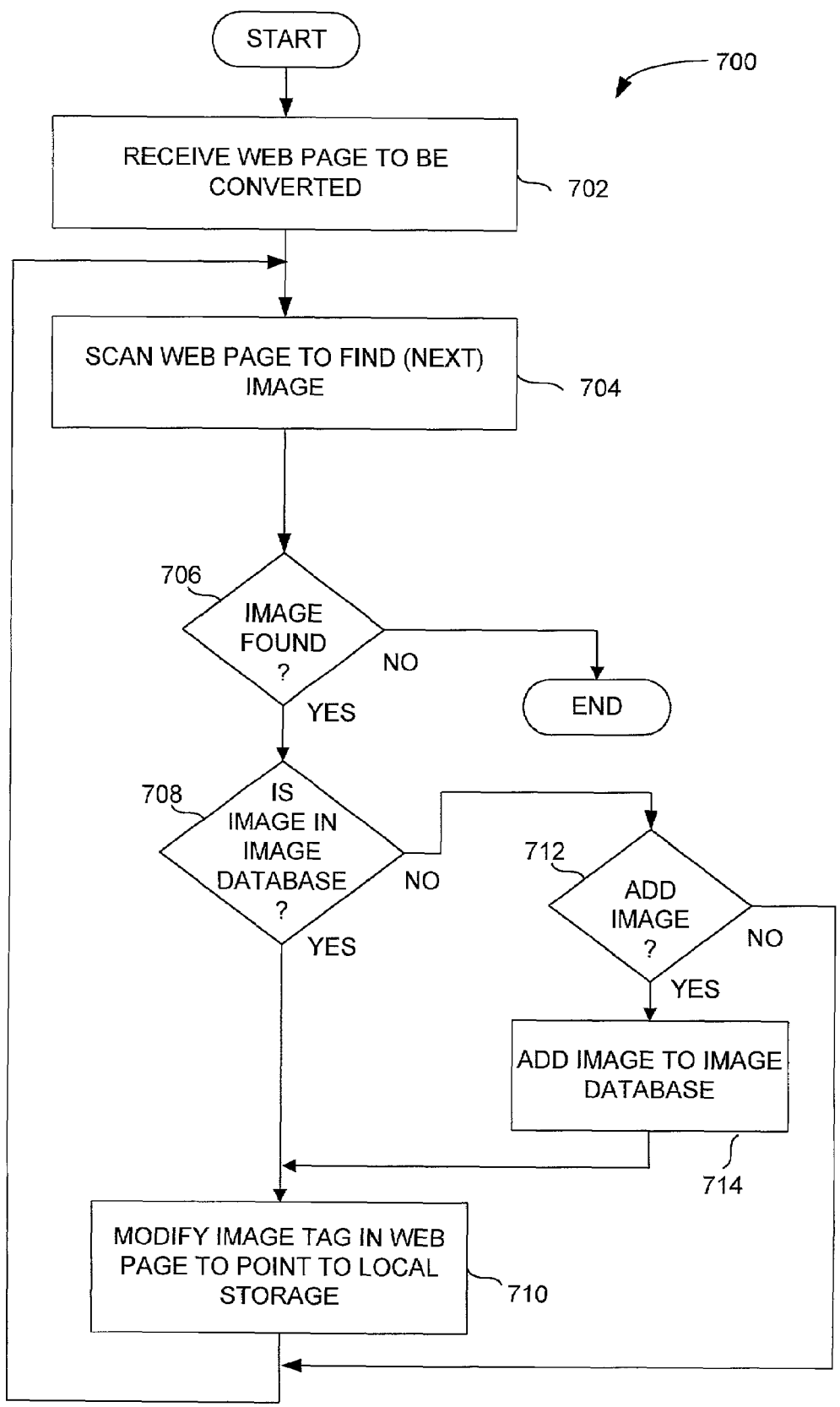
FIG. 7 is a flow diagram of web page modification processing according to one embodiment of the invention.

FIG. 7 is a flow diagram of web page modification processing 700 according to one embodiment of the invention. The web page modification processing 700 represents one approach to modify conventional web pages to cause local content to be used or at least preferred.

The web page modification processing 700 begins by receiving 702 a web page to be converted. Typically, the web page would be received at a server machine that is performing the web page modification processing 700. The server machine can be the remote server that hosts the web page or some other server machine. Next, the web page is scanned 704 to find an image (more generally, media-rich component) therein. Typically, the web page is an HTML document and as such includes image tags that serve to identify images. Hence, the scanning 704 can search the web page for image tags. A decision 706 then determines whether an image has been found. When the scanning 704 is unable to identify an images, then the web page modification processing 700 is complete and ends.

On the other hand, when an image is found, a decision 708 determines whether the image is already in an image database. The image database is an image storage area where images from various web sites can be maintained. Hence, thereafter the images needed for the portable computer readable storage products are retrieved from the image database. When the decision 708 determines that the image is in the image database, then the image tag in the web page for the image is modified 710 to point to local storage. Namely, the image tag is modified to point to a local (client) data storage device that accesses the portable computer readable medium. After the image tag is modified, the web page modification processing 700 returns to repeat the scanning 704 and subsequent operations so that a next image within the web page can be processed.

Alternatively, when the decision 708 determines that the image is not in the image database, a decision 712 determines whether the image is to be added to the image database. The decision 712 thus enables some images not to be placed in the image database (and thus not on portable computer readable storage products). For example, a web site owner may not want certain images to be out of their immediate control. As another example, a system administrator may decide that some images are small enough in size or infrequently used such that they need not be provided in the image database. When the decision 712 determines that the image should be added to the image database, the image is added 714 to the image database and then the web page modification processing 700 performs the operation 710 and subsequent operations. On the other hand, when the decision 712 determines that the image should not be added to the image database, then the web page modification 700 returns to repeat the scanning 704 and subsequent operations so that a next image within the web page can be processed.

As an example of a modification of a conventional (HTML) web page to a modified web page, consider the following as a portion of the conventional web page:
<html>
<head>
<title>

```
Exemplary Web page—conventional
</title>
</head>
<body>
    *
    *
    *
img   src="/abc/def/images/image-001.gif"   width=100
    height=50
border=0
    *
    *
    *
</body>
</html>
```

Then, the corresponding portion of the resulting modified web page according to one embodiment of the invention is as follows:

```
<html>
<head>
<title>
Exemplary Web page—performance enhanced
</title>
</head>
<body>
    *
    *
    *
img    src="D:/images/image-001.gif"    width=100
    height=50 border=0
    *
    *
    *
</body>
</html>
```

Note that the source for the image tag now point to a local storage device as opposed to a remote server. The above example can be done in advance or during processing of the web page. When performed during processing, a script language (e.g., JavaScript, VBscript, etc.) or other programming language can be utilized (e.g., embedded in the web page) to dynamically produce or select the appropriate image source tag for the situation.

The data (e.g., images) stored on the portable computer readable product can be compressed. Hence, with compression, the portable computer readable product can store more data. For example, a 1 Gigabyte CD can store 100,000 images compressed to 10,000 bytes.

The images stored on the portable computer readable product can be assigned special codes to be used with host websites and web browsers. Generally available merchandise can thus be viewed on a large number of websites and thus all such websites can use the appropriate special codes to access the common images for use as a portion of a web page. In other words, standard codes can assigned to products (e.g., common merchandise) so many websites can use images common images. This facilitates manufacturers and sellers in updating their images at a central location.

The host websites that utilize the local content to reduce their bandwidth demands can be charged based on the bytes of data accessed from the portable computer readable storage product. The rate can be significantly less than what host sites will otherwise pay for bandwidth costs. In one embodiment, there would be no charge for re-viewing a web page when the content is retrieved from its cache memory. The host websites can alternatively be charged at a portion of the transaction costs. In one embodiment, the client machine can send information to a transaction monitoring server to notify the transaction monitoring server about the data that has been accessed from the portable computer readable storage product and for what host website, thereby facilitating charging host website based on bytes of data accesses.

Still further another aspect of the invention is that when the portable computer readable storage product is being accessed, a small image (e.g., icon) can be displayed on the web page including the data (content) being retrieved from the portable computer readable storage product. The small image serves to providing branding for the website enhancements provided through use of the portable computer readable storage products.

The invention is also advantageous when data centers or mirror sites are used by host websites. The invention greatly reduces the amount of data that needs to be retrieved from data center. The response time for retrieving such data can be more relaxed due to smaller amount of data within a certain amount of time. Therefore, the speed and capacity requirements for such storage units at the data center is greatly reduced. At the same time, the amount of data needed to be transmitted to the client users through Internet is reduced.

The advantages of the invention are numerous. Different embodiments or implementations may yield one or more of the following advantages. One advantage of the invention is that media-rich websites can be automatically modified to support access to locally available content. Another advantage of the invention is that portable computer readable storage media can be made created through an examination of websites to be supported. Still another advantage of the invention is that the inventive techniques are cost effective and facilitate use of media-rich websites for promotion and sale of good and services.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A method for modifying a web page at a server computer to point to local content instead of remote content, said method comprising:

receiving, at the server computer, a web page to be modified;

scanning, at the server computer, the web page to locate an image in the web page;

determining, at the server computer, whether the image is supported by an image database that stores images associated with exclusively portable computer readable storage products distributed to users; and modifying, at the server computer, the web page to direct retrieval of content for the image to be retrieved locally from the portable computer readable storage products instead of from the remote content, wherein subsequently the modified web page can be delivered to a requestor's computer such that the requestor's computer never needs to receive the remote content for the image over a network connection; instead, the focal content for the image is retrieved locally from the portable computer readable storage product.

2. A method as recited in claim 1, wherein the image has an image tag that provides a remote address for the remote content for the image, and
    wherein said modifying operates to modify the image tag to point to the portable computer readable storage products instead of the remote content.

3. A method as recited in claim 1, wherein said method further comprises:
    adding the image to the image database when said determining determines that the image is not yet supported by the image database.

4. A method for modifying a web page at a server computer to point to local content on an exclusively portable computer readable storage product instead of remote content, said method comprising:
    receiving at the server computer, a web page to be modified, the web page including at least one image, and the source for the content for the image being linked to a remote location; and
    modifying, at the server computer, the web page to direct retrieval of content for the image to be retrieved locally from the portable computer readable storage product instead of from the remote content,
    wherein subsequently the modified web page can be delivered to a requestor's computer such that the requestor's computer never needs to receive the content for the image from the remote location over a network connection; instead, the content for the image is retrieved locally from the portable computer readable storage product.

5. A method for creating portable computer readable storage products to be distributed to users, said method comprising:
    receiving web pages to be modified;
    scanning the web pages to locate high-bandwidth content on the web pages;
    determining whether the high-bandwidth content is supported by a database that stores high-bandwidth content associated with exclusively portable computer readable storage products to be created;
    adding the high-bandwidth content to the database when said determining determines that the high-bandwidth content is not yet supported by the database;
    creating exclusively portable computer readable storage products for distribution to users by storage of the high-bandwidth content from the database to the portable computer readable storage products, whereby when the exclusively portable computer readable storage products are distributed to users, the high-bandwidth content is already stored to the exclusively portable computer readable storage products; and
    modifying the web pages to direct retrieval of content for the high-bandwidth content locally from the portable computer readable storage products.

6. A method as recited in claim 5, wherein the high-bandwidth content is images.

7. A method as recited in claim 5, wherein said method further comprises:
    distributing the portable computer readable storage products that have been created to users.

8. A method as recited in claim 5, wherein the portable computer readable storage products are either compact discs or memory cards.

9. A method as recited in claim 5, wherein said distributing the portable computer readable storage products comprises mailing the portable computer readable storage products to its users.

10. A method as recited in claim 9, wherein the portable computer readable storage products are either compact discs or memory cards.

11. A method as recited in claim 10, wherein the portable computer readable storage products are read-only memory devices.

12. A computer readable medium including at least computer program code for automatically modifying a web page to point to local content on an exclusively portable computer readable storage product instead of remote content, said computer readable medium comprising:
    computer program code for receiving a web page to be modified, the web page including at least one high-bandwidth content component, the source for the content for the high-bandwidth content component being linked to a remote location; and
    computer program code for modifying the web page to direct retrieval of content for the high-bandwidth content component to be retrieved locally from the portable computer readable storage product instead of from the remote content,
    wherein subsequently the modified web page can be delivered to a requestor's computer such that the requestor's computer never needs to receive the high-bandwidth content component over a network connection; instead, the high-bandwidth content component is retrieved locally from the portable computer readable storage product.

13. A computer readable medium as recited in claim 12, wherein the remote location is a remote server that is accessed through a network.

14. A computer readable medium as recited in claim 13, wherein the network includes the internet.

15. A computer readable medium as recited in claim 12, wherein the least one high-bandwidth content component has a source location provided within the web page, and
    wherein said modifying operates to alter the source location for the least one high-bandwidth content component to point to data previously stored to the portable computer readable storage product.

16. A computer readable medium as recited in claim 15, wherein the least one high-bandwidth content component is an image.

17. A computer readable medium as recited in claim 16, wherein the remote location is a remote server that is accessed through a network.

18. A computer readable medium as recited in claim 17, wherein the network includes the internet.

19. A computer readable medium as recited in claim 12, wherein the portable computer readable storage product is a read-only memory device.

* * * * *